No. 699,090. Patented Apr. 29, 1902.
E. KEMPSHALL.
GOLF BALL.
(Application filed Mar. 25, 1902.)
(No Model.)

Witnesses:
Robert Head
A. C. Abbott

Inventor:
Eleazer Kempshall,
By his Attorney,
F. H. Richards.

UNITED STATES PATENT OFFICE.

ELEAZER KEMPSHALL, OF BOSTON, MASSACHUSETTS, ASSIGNOR TO THE KEMPSHALL MANUFACTURING COMPANY, A CORPORATION OF NEW JERSEY.

GOLF-BALL.

SPECIFICATION forming part of Letters Patent No. 699,090, dated April 29, 1902.

Application filed March 25, 1902. Serial No. 99,932. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Golf-Balls, of which the following is a specification.

This invention relates to balls such as used in golf and other games; and its object is to improve the durability, efficiency, and quality of the ball.

The ball is constructed with a hard springy shell, preferably of celluloid, inclosing a spherical core, around which I place a band, which serves to reinforce the weld of the shell-segments.

Figure 1:
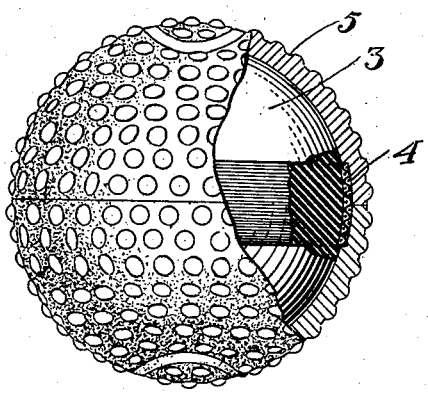
Figure 2:
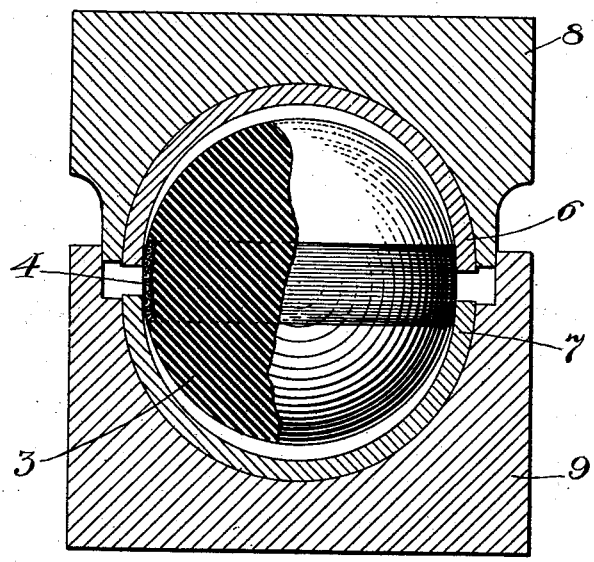

In the drawings forming a part of this specification, Figure 1 is a view, partly in section, of a ball made according to my present improvements; and Fig. 2 illustrates the manufacture of the same.

Similar characters of reference designate like parts in the figures.

I produce the center piece (designated by 3) of the required size and shape, preferably of highly-vulcanized soft rubber, and around its equator I place a substantial ligament, band, or belt 4 of fabric or other material. The shield 5 I preferably form in hemispherical segments, as 6 and 7, Fig. 2. The filling 3 is placed between said segments, so that the belt will be in the region of the joint of the shell, and the whole is then placed between forming and heating dies, as 8 and 9, whereupon the latter are heated and brought together. The resultant pressure upon the core 3 tends to cause the material thereof to squeeze out between the edges of the segments and prevent the proper contact and welding of the edges of the segments; but the ligament 4 not only prevents the forming of such a fin, but unites with or becomes embedded in the plastic celluloid and substantially reinforces the weld, so that the shell is less liable to burst at the joint when dealt a blow from an implement.

The ball is retained by the die until the shell cools and hardens, so that it may retain its shape and hold the core permanently under compression, which in turn also has a tendency to distend the shell, whereby the latter is maintained spherically true. The solid core is inexpensive and may consist of somewhat-heavy india-rubber so highly vulcanized that it may withstand the heating effect of the dies, the intention being to render the shell plastic by heat without injuring the rubber.

Having described my invention, I claim—

1. A playing-ball comprising a soft-rubber core, a welded shell composed of hemispherical segments inclosing said core, and a ligament reinforcing said weld.

2. A playing-ball comprising a shell of hemispherical segments of celluloid welded and compressed upon a filling of elastic material, and a ligament internally reinforcing said weld.

3. A playing-ball comprising a yielding spherical core, a shell composed of hemispherical segments of plastic material welded together and compressed upon said core, and a ligament internally reinforcing the weld.

4. A playing-ball comprising a spherical body, a shell built up from hemispherical segments of plastic material welded together and holding said body under compression, and a ligament reinforcing the welds of the segments and embedded in the material of the shell.

5. A playing-ball comprising a spherical highly-vulcanized rubber core, a shell composed of hemispherical segments of plastic material compressed upon said core, and a fabric ligament embedded in the shell and reinforcing the weld.

6. A playing-ball comprising a welded shell of hemispherical segments of celluloid compressed upon a filling of elastic material, said filling being held under compression by said shell, and a fabric band internally reinforcing the shell at the weld, and embedded in the celluloid.

ELEAZER KEMPSHALL.

Witnesses:
B. C. STICKNEY,
F. W. BARNACLO.